(12) United States Patent
Gasper

(10) Patent No.: US 9,908,461 B2
(45) Date of Patent: *Mar. 6, 2018

(54) METHOD AND SYSTEM FOR ACTUATING A BRAKE LIGHT

(71) Applicant: Joseph J. Gasper, Gainesville, FL (US)

(72) Inventor: Joseph J. Gasper, Gainesville, FL (US)

(*) Notice: Subject to any disclaimer, the term of this patent is extended or adjusted under 35 U.S.C. 154(b) by 75 days.

This patent is subject to a terminal disclaimer.

(21) Appl. No.: 14/930,340

(22) Filed: Nov. 2, 2015

(65) Prior Publication Data

US 2016/0121786 A1 May 5, 2016

Related U.S. Application Data

(63) Continuation-in-part of application No. 12/480,811, filed on Jun. 9, 2009, now Pat. No. 9,174,570.

(60) Provisional application No. 62/073,742, filed on Oct. 31, 2014.

(51) Int. Cl.
*B60Q 1/44* (2006.01)
*B60Q 1/26* (2006.01)

(52) U.S. Cl.
CPC .......... *B60Q 1/445* (2013.01); *B60Q 1/2615* (2013.01); *B60Q 2900/10* (2013.01); *B60Q 2900/30* (2013.01)

(58) Field of Classification Search
CPC ... B60C 1/445; B60C 1/2615; B60C 2900/10; B60C 2900/30
USPC .......................................... 362/464
See application file for complete search history.

(56) References Cited

U.S. PATENT DOCUMENTS

| | | | | |
|---|---|---|---|---|
| 4,769,629 A | * | 9/1988 | Tigwell | B62J 6/001 200/61.45 R |
| 5,736,926 A | * | 4/1998 | Winholtz | B60Q 1/0023 340/467 |
| 6,229,438 B1 | * | 5/2001 | Kutlucinar | B60Q 1/46 340/438 |
| 6,249,219 B1 | * | 6/2001 | Perez | B60Q 1/444 340/438 |
| 6,411,204 B1 | * | 6/2002 | Bloomfield | B60Q 1/302 340/464 |
| 7,154,387 B2 | * | 12/2006 | Boomershine, III | B60Q 1/44 340/463 |
| 7,649,447 B2 | * | 1/2010 | Lu | B60Q 1/444 340/427 |

(Continued)

FOREIGN PATENT DOCUMENTS

GB 2 257 672 A * 1/1993

*Primary Examiner* — Laura Tso
(74) *Attorney, Agent, or Firm* — Saliwanchik, Lloyd & Eisenschenk

(57) ABSTRACT

Embodiments of the present invention can provide an accessory control system, a light control system, and/or a brake light control system for golf carts and/or other vehicles, including trailers, motorized vehicles, and non-motorized vehicles. Embodiments relate to a control system that can be easily installed on a golf cart and/or other vehicles. Specific embodiments relate to a light system that has few is any wires connecting the light system to, or interfering with, any existing electrical circuitry of the gold cart. Specific embodiments can be installed on any golf cart, such as in the same location(s) as prior light systems. Embodiments of the subject light system can be rear tail lights, rear braking lights, front running lights, and/or front headlights.

16 Claims, 12 Drawing Sheets
(6 of 12 Drawing Sheet(s) Filed in Color)

(56) References Cited

U.S. PATENT DOCUMENTS

| | | | |
|---|---|---|---|
| 8,841,999 B2* | 9/2014 | Ali | B60Q 1/2673 340/467 |
| 9,174,570 B2* | 11/2015 | Gasper | B60Q 1/1415 |
| 2005/0237172 A1* | 10/2005 | Boomershine, III | B60Q 1/44 340/467 |
| 2006/0061466 A1* | 3/2006 | Garcia Briz | B60Q 1/2607 340/479 |
| 2008/0291003 A1* | 11/2008 | Carpenter | B60Q 1/0088 340/463 |
| 2013/0111651 A1* | 5/2013 | Waters | A42B 1/004 2/209.13 |
| 2014/0354422 A1* | 12/2014 | Olson | B60Q 1/445 340/465 |
| 2015/0062936 A1* | 3/2015 | Braunberger | B62J 6/02 362/466 |
| 2015/0251593 A1* | 9/2015 | Zhou | F21S 48/20 362/541 |

\* cited by examiner

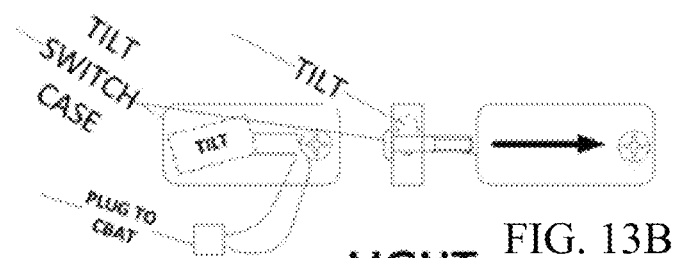
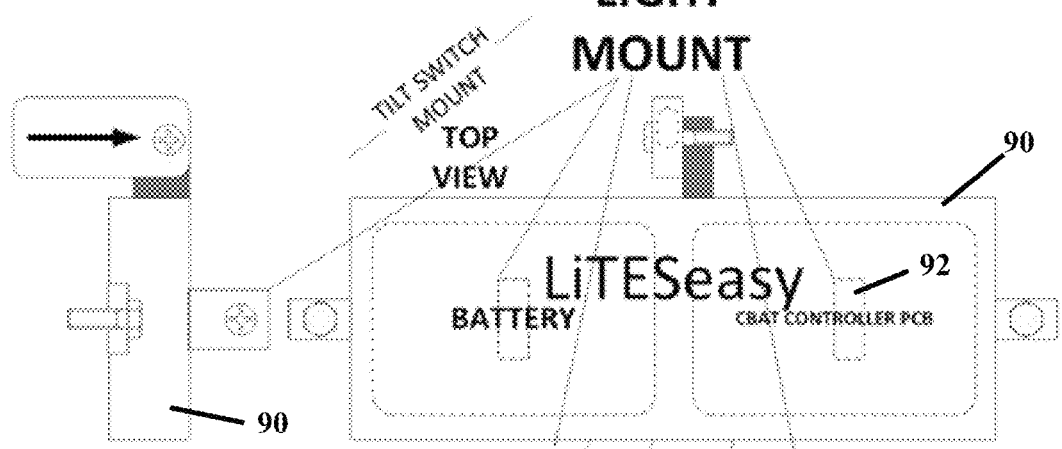
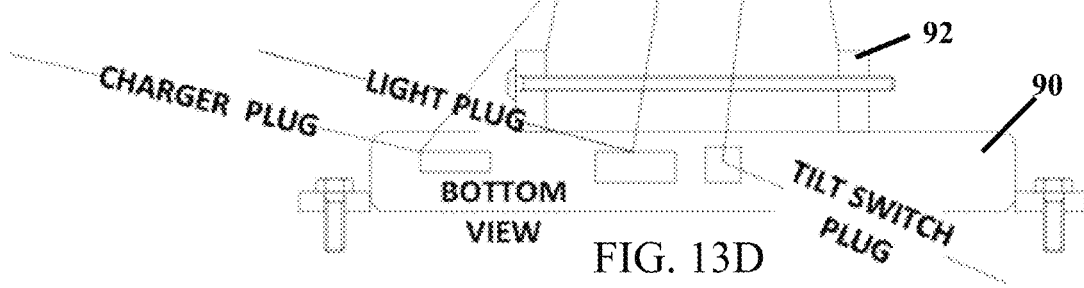
FIG. 13B
FIG. 13C
FIG. 13A
FIG. 13D

METHOD AND SYSTEM FOR ACTUATING A BRAKE LIGHT

CROSS-REFERENCE TO RELATED S

This application is a continuation-in-part application of U.S. patent application Ser. No. 12/480,811, filed Jun. 9, 2009, now U.S. Pat. No. 9,174,570. This application also claims the benefit of U.S. provisional patent application Ser. No. 62/073,742, filed Oct. 31, 2014, both of which are incorporated herein by reference in their entirety.

FIELD OF THE INVENTION

Embodiments of the subject invention relate to actuating a brake light on a vehicle, such as a golf cart, a trailer, a tractor, a utility vehicle, a moped, a motorcycle, a lawn mower, a bicycle, an electric bicycle, and/or an all-terrain vehicle. Embodiments relate to a light and/or accessory control system that allows a user to install accessories, such as head lights, brake lights, turn signals, and/or a horn on a new or used vehicle and operate those accessories. Embodiments can incorporate a sender that transmits wireless signals to a controller of such a light and/or accessory control system.

BACKGROUND OF THE INVENTION

Currently, many vehicles, particularly, golf carts, trailers, tractors, utility vehicles, a moped, a motorcycle, a lawn mower, a bicycle, an electric bicycle, and all-terrain vehicles, do not come equipped with headlights, brake lights, turn signals and/or horns. This lack of such safety equipment is because such vehicles are built for special purposes and uses. For instance, most golf carts are built to be used solely on golf courses where these types of safety accessories are not necessarily needed. However, many people buy golf carts to use not just as a means of transportation on golf courses but also around their neighborhoods and communities. This is especially true of people who live in golf or country club communities and own their own golf carts and drive their golf carts on streets from their homes to the golf course where others are operating automobiles and other vehicles. The lack of safety accessories, such as headlights, brake lights, turn signals and/or horns, on these golf carts pose serious safety risks and is against the law in certain locations. Further, installation of such equipment can be beneficial even if the golf cart is used in a typical fashion on a golf course. Currently, if someone wants to install accessories on a golf cart, the accessories are typically hard-wired to controls mounted on the golf cart, thereby making installation difficult and expensive.

Increasingly, golf carts and other vehicles are adapted to conform to "street legal" statutory requirements, such as in retirement and golfing communities. To satisfy statutory requirements, the brake light is ideally activated automatically upon braking.

Therefore, a need exists for an accessory kit that may be easily installed on a vehicle so that the vehicle can be equipped with one or more accessories, such as one or more headlights, one or more turn signals, one or more brake lights, and one or more horns. Such accessories can make the vehicle safer to operate on streets and around other vehicles and/or more enjoyable to operate.

Wired, and/or partially wireless, light systems for incorporation with vehicles, such as golf carts, can be wired to a battery or other power source already installed on the vehicle (golf cart) for powering the drive system of the vehicle (golf cart), and can utilize a wireless transmitter to allow a driver to controller the lights. Various features can be considered drawbacks, including the need for wires to connect to the battery or other power source already installed on the golf cart for powering the drive system and/or other apparatus of the golf cart, manufacturing defects, and the difficulty of installing the light system. There are many models of golf carts, each potentially having a different power source, such as gas, electric, 6-volt batteries, and/or 8-volt batteries, which can create uncertainty as to what power source the light system will be connected to if a light system is sold separately to be added to a golf cart. Regenerative braking and/or other apparatus can also be interconnected to the battery or other power source, which can create uncertainty as to what issues there will be with respect to the power delivered from power source the light system will be connected to if a light system is sold separately to be added to a golf cart. Manufacturing defects and customers' difficulties with installing a light system to be added to their golf cart, or to the vehicle, can result in extra costs and service issues. Accordingly, there is a need for a light system that can be installed independently the battery or other power source already installed on the golf cart for powering the drive system and/or other apparatus of the golf cart, such by incorporating a Lithium ion battery, or other independent power source, into the golf cart light system.

SUMMARY OF THE INVENTION

Embodiments of the present invention can provide an accessory control system, a light control system, and/or a brake light control system for golf carts and/or other vehicles, including trailers, motorized vehicles, and non-motorized vehicles. Embodiments relate to a control system that can be easily installed on a golf cart and/or other vehicles.

Embodiments can incorporate a wireless sender that communicates with a controller of the control system.

Embodiments of the control system may be retrofitted to golf carts and/or other vehicles, such as trailers, tractors, utility vehicles, mowers, all-terrain vehicles and so forth.

Embodiments of the control system for golf carts and/or other vehicles can reduce wiring requirements, such as reduce wiring requirements by at least 33%.

Embodiments of the control system for golf carts and/or other vehicles can reduce installation, for example reduce installation time by 75%, compared with installation of control systems interconnected with the controls mounted on the vehicle.

Embodiments of the subject control system for golf carts and/or other vehicles can have one or more brake lights that are activated automatically upon a deceleration of the vehicle reaching a threshold and/or a deceleration of the vehicle reaching a sufficient magnitude over a sufficient period of time. Embodiments can incorporate a sender that permits a user to remotely activate one or more accessories, such as one or more headlights, one or more side marker lights, one or more horns, one or more turn signals, one or more auxiliary lights, one or more radios, one or more dome lights, by sending wireless signals via a wireless transmitter of the sender to a controller, or multiple controllers, electronically connected to the accessories. The wireless signals may be coded signals. In addition, the wireless transmitter may be a multi-frequency wireless transmitter. The sender can have one or more buttons, or other user interface mechanisms, to activate and/or deactivate the accessories. The sender may also have indicator lights, or other visual and/or audial indicators, to indicate when accessories are activated, deactivated, and/or transitioned between activated and deactivated. The sender may be mounted on, or near a steering wheel or operator seat. In addition, accessories may be activated and/or deactivated using a timer, a speedometer, an accelerometer, a motion sensor, and/or other sensor.

In an embodiment, a timer can deactivate a turn signal after a predetermined amount of time after the turn signal is activated, or after a predetermined amount of time after an activation signal or event terminates. In an embodiment a tilt switch can close a circuit, which can be considered an activation signal or event, the closing of the circuit can cause the brake light to light up, and a timer can cause the brake light to turn off a predetermined amount of time after the tilt switch no longer closes the circuit. In an embodiment, a brake light can be activated and/or deactivated by a motion sensor, a tilt switch, an accelerometer, a speedometer, and/or a timer. In an embodiment, the brake light can be rear-facing and/or be visible from the rear of the vehicle, and can optionally be mounted on the rear of the vehicle, or elsewhere, such as on a side mirror, the frame of the vehicle, or a headrest. In an embodiment, the brake light can be activated by a motion that tends to cause deceleration of the vehicle, and such a motion may optionally be detected by, for example, a motion sensor, a tilt switch, an accelerometer, and/or a speedometer. In an embodiment, the brake light can be deactivated after a predetermined amount of time after activation or after an activation event terminates, after a period of time based on the circumstances, or after the conclusion of a physical process, by, for example, a timer and/or a device that implements a physical process. Since it is common for some vehicles to have heavy-duty or stiff suspensions, e.g., if the suspension is designed for use on rough terrain, embodiments can incorporate structures to reduce and/or minimize the transfer of vibrations across the subject control system.

Specific embodiments relate to a light system that has few is any wires connecting the light system to, or interfering with, any existing electrical circuitry of the gold cart. Specific embodiments can be installed on any golf cart, such as in the same location(s) as prior light systems. Embodiments of the subject light system can be rear tail lights, rear braking lights, front running lights, and/or front headlights. Embodiments of the subject light system can incorporate modular parts, such as modular parts in a light kit, which can easily be replaced. The ability to replace modular parts allows less importance to be places on defects and failures, and related costs.

A potential weakness of the batteries utilized with embodiments of the subject light system is exposure of the batteries to the sun, and the batteries getting too hot, which can reduce battery life. Optional fins are shown on the battery case in FIG. 9. These fins are not to dissipate heat, as is often the purpose of fins, as the case is plastic and, therefore, not very thermally conductive. The fins act as a shade, e.g., like a pergola, to reduce the surface area directly exposed to sunlight. Specific embodiments can have a chrome plating plastic, which can reduce absorbed heat by about 33%. The fins may also provide an additional cooling effect.

Embodiments of the subject light system can incorporate one or more tilt switches, as taught herein, in the brake light system. The tilt switch can be located in a switch pod attached to the rear light battery case. Mounting the switch pod on the exterior of the battery case allows for the tilt switch to be adjusted for each installation assuring consistent operation on each cart. The headlight can be located on a, usually slightly convex, spot centered under the folded over plastic windshield installed on most carts.

Specific embodiments have a battery case that is also the light bracket for attachment of the light system to the gold cart. The battery case can be attached to the golf cart via a variety of mechanisms, such as screws, or bolts, passing through tabs on the case (e.g., tabs on each side of the case), double face tape dense foam double face tape, and in a specific embodiment, ¼", ⅜", and/or other thickness dense foam double face tape. The thick dense foam double face tape can help to attach the light system to surfaces of golf carts having a variety of shapes, such as convex, concave, or flat shapes (e.g., the surface of the golf cart's front cowl). Using strips of the thick dense foam double face tape can create a space, or gap, between the strips of tape and between the light system and the surface the light system is mounted to, to allow air to pass under the case and cool the underside of the light system. In addition, using strips of the thick dense foam double face tape can create a space, or gap, between the strips of tape and between the light system and the surface the light system is mounted to, for water to flow through under the light system and away, such that the water does not collect on, or seep into the battery case. The thick dense foam double face tape can allow easy transfer from one golf cart to another, when attached with tape only.

A remote control can be used to operate the light. The remote control can be mounted on the golf cart, such as via a mount on the steering wheel. In an embodiment, the electronics of the light system can be position near the center of the light system and receive signals from the remote control, with the lights (e.g., LED lights) can be positioned at the outside ends of the light system. Embodiments of the light system, receiving operating signals form a remote control, can be on standby all the time, listening for the signal from the remote control. Other embodiments, can operate in a manner such that the receiver is not on standby all the time, as always being on standby can greatly reduce the available power to operate the lights when needed. In an embodiment, the light system can incorporate a very sensitive vibration switch light, such that the light system listens for the signal from the remote control when the very sensitive vibration switch light is activated. In this way, any time the golf cart is jostled the light system can go into standby mode, and stay on standby mode, for a certain period of time, until movement stops, until movement stops followed by a certain period of time, or other criterion is met. Specific embodiments can incorporate 6 amp hour batteries that will light up to 14 hours for the headlight, and up to 30 hours for the tail light, where the headlight is a total of 6 watts 600 lumens, such that an average cart owner can charge the batteries once or twice a month. An electronic gauge can be incorporated to indicate the battery status. The batteries should take a charge between 300 and 500 times, and lose about 20% storage capacity a year. A charger and cables, can be incorporated, and can be lighted yellow to reduce tripping over and driving off before disconnecting.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

In the following detailed description, reference will be made to the attached drawings in which:

FIG. 13A, 13B, 13C, and FIG. 13D show a top view of the battery case and mount for the light fixture, side view of the tilt switch case, a side view of the battery case and mount for the light fixture, and a front view of the battery case and mount for the light fixture, respectively, of a wireless light system for golf carts and/or other vehicles.

DETAILED DESCRIPTION

Figure 1:
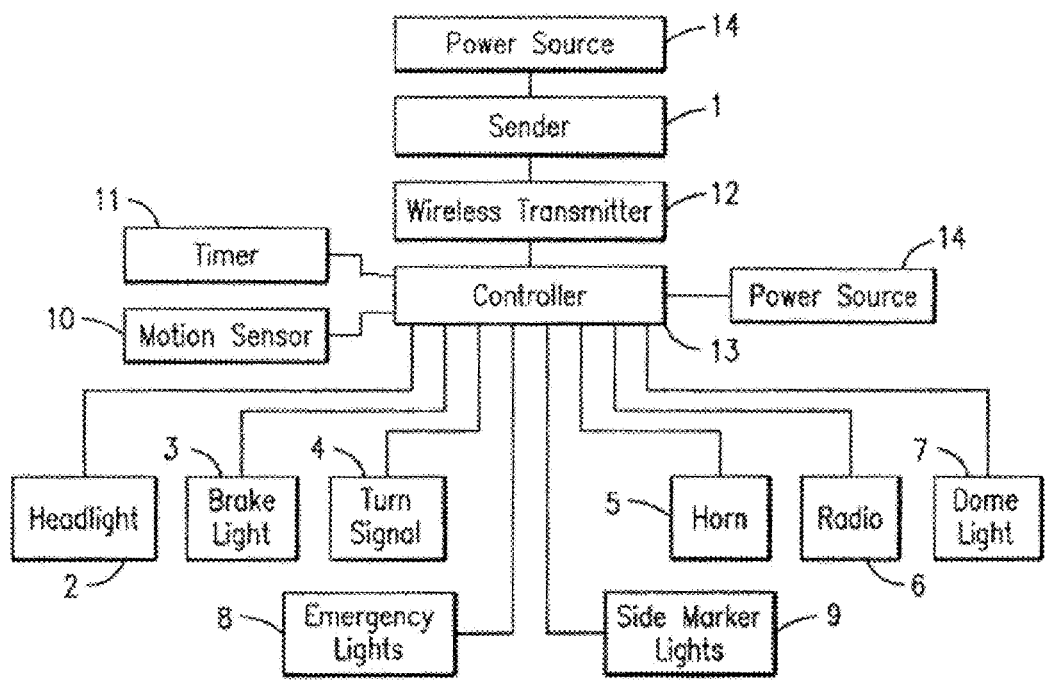
FIG. 1 is a block diagram of a wireless light and accessory control system for golf carts and/or other vehicles.

Embodiments of the subject invention relate to a control system, accessory control system, and/or a brake light control system for installation onto vehicles such as golf carts, trailers, tractors, go-carts, all-terrain vehicles, a moped, a motorcycle, a lawn mower, a bicycle, an electric bicycle, personal transportation vehicles, and personal assistive mobility devices. Embodiments relate to a brake light control kit, and a method of controlling brake lights. Embodiments of the subject invention feature a braking sensor that detects when a force tending to cause braking is applied, such that when the braking sensor detects braking, the one or more brake lights are activated (e.g. "turned on" or illuminated). In an embodiment, the braking sensor directly activates the one or more brake lights. In another embodiment, the braking sensor is operably connected to a printed circuit board and/or controller, the braking sensor relays a braking signal to the printed circuit board and/or controller. In a further embodiment, the printed circuit board and/or controller has a processor that activates and/or deactivates the one or more brake lights when, for example, a certain input is received. A power supply can be utilized to power each electronic element, including the one or more brake lights, the one or more braking sensors, and the printed circuit board and/or controller.

In an embodiment, the printed circuit board and/or controller incorporates and/or interconnects with a countdown timer, a clock, or other circuitry to provide an indication that a predetermined period of time had passed since a prior event (e.g., activation of the brake light, receipt of signal, a period of time dependent on other input has passed since a prior event, or a period of time within a range has passed since a prior event). The controller can then control the duration of brake light activity, or the "illumination period." In an embodiment, a countdown timer can be triggered upon an event occurring, and the brake light(s) can be deactivated once the countdown timer counts down. In an embodiment, the countdown timer is a countdown timer circuit in electronic communication with the printed circuit board and/or controller. When the countdown timer expires, the supply of electricity to the brake lights is discontinued, thus ceasing brake light illumination. In a specific embodiment, the timer is pre-programmed such that the brake lights deactivate after a period of activation/illumination of at least 1, 2, 3, 4, and/or 5 seconds, in the range of 1-2 seconds, 2-3 seconds, 3-4 seconds, 5-6 seconds, 7-8 seconds, or 9-10 seconds, and/or at least 10 seconds. In another embodiment, the brake lights deactivate after the brake light(s) have illuminated for a period of time following an event, such as an amount of deceleration falling below a threshold deceleration, a value of speed falling below a certain value, and/or one or more other indicia of motion or change in motion reaching a certain value or meeting a certain criterion. The illumination period may be determined based on such criteria as safety, typical vehicle speeds, typical vehicle usages, and expected sophistication of the average operator.

Figure 6:
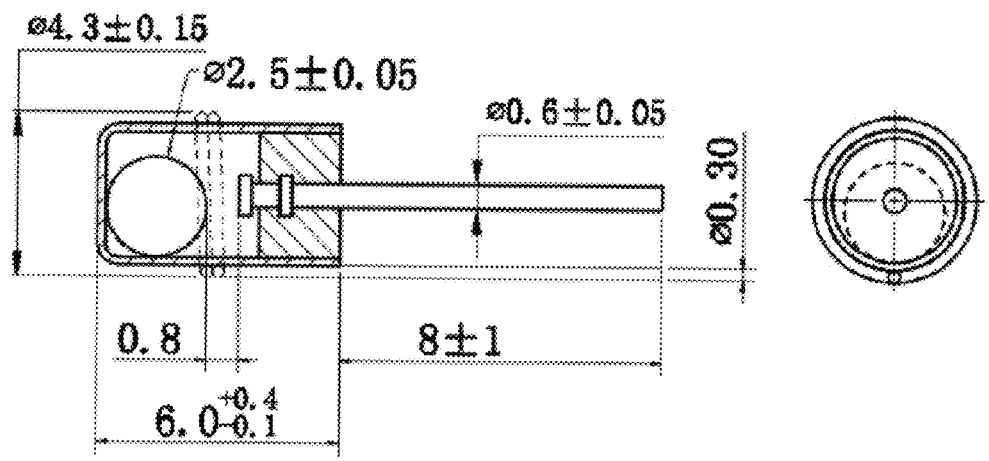
FIG. 6 shows a schematic of a tilt switch that can be utilized in accordance with an embodiment of the invention.
Figure 7A:
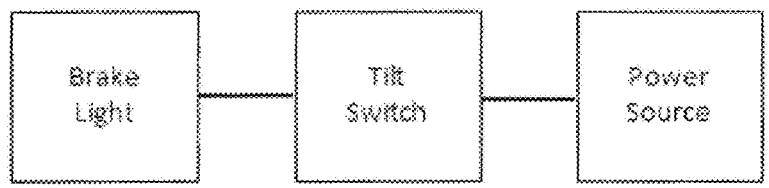
FIG. 7A shows a block diagram of brake control circuit in accordance with an embodiment of the subject invention.
Figure 7B:
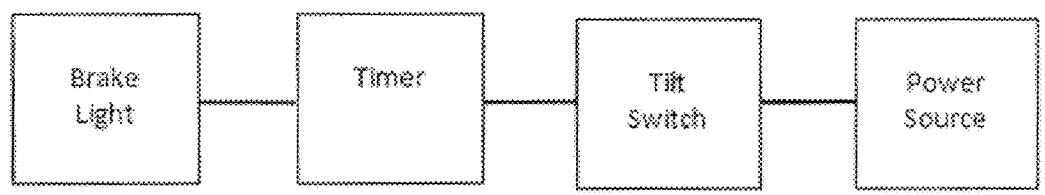
FIG. 7B shows a block diagram of brake control circuit in accordance with an embodiment of the subject invention.
Figure 7C:
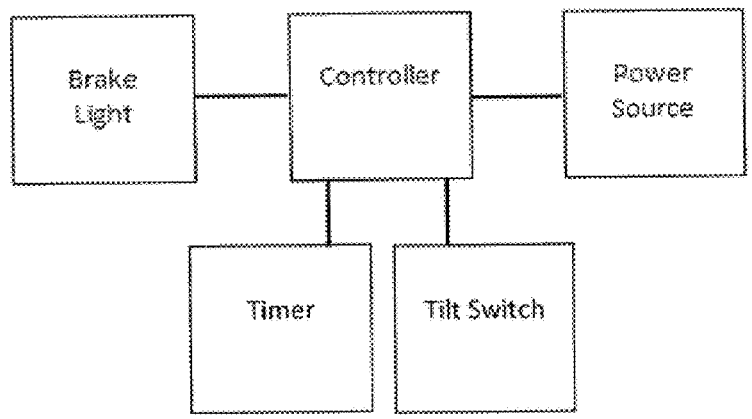
FIG. 7C shows a block diagram of brake control circuit in accordance with an embodiment of the subject invention.

In an embodiment, a braking sensor can incorporate a tilt switch, such as a mercury tilt switch, a digital inclinometer, an electrolytic tilt switch, an optical tilt switch, a spring accelerometer, and/or a MEMS switch. In a specific embodiment, the tilt switch is a rolling ball tilt switch. FIG. 6 shows a schematic of a specific single ball motion activated tilt switch. Embodiments can be utilized with dimensions other than shown in FIG. 6. A rolling ball tilt switch can have a housing within which is a substantially cylindrical tube with closed ends, where the tube encloses one or more balls that are permitted to roll freely within the tube. The one or more balls can follow a path such that the center of the one or more balls follow a path substantially parallel with a longitudinal axis and displaced from the longitudinal axis by a distance equal to the difference between the radius of the cylinder and the radius of the ball. When the switch is rotated past a critical tilt angle with respect to the gravitational field of the earth, or when the housing of the switch experience a deceleration pattern, that for a given orientation of the switch with respect to the earth's gravitational field, causes the ball to roll up the tube (cylinder) so as to close the trigger circuit. In an embodiment, given the rotational angle the housing is positioned with respect to earth's gravitational field in a plane in which the tube lies, the deceleration pattern needed to cause the ball to close the trigger circuit is a combination of the magnitude of deceleration and the duration of time, and depends on the initial conditions of the ball. The ball(s) roll along the tube until reaching a trigger end of the tube. At the trigger end of the tube is a pair of tilt switch trigger contacts, such that a trigger circuit is open until the ball rolls into a position of contact with bolt tilt switch trigger contacts and closes the trigger circuit. The outermost portion of the ball is sufficiently electrically conductive that the ball allows electric current to pass from one contact to the other so as to close the trigger circuit. In a specific embodiment, rolling ball tilt switch Model BL 370H S manufactured by Dongguan Bailin Electron Co., Ltd. is utilized. FIG. 6 shows a schematic of this rolling ball tilt switch. This rolling ball tilt switch features a center-mounted contact pin and a single ball such that when the ball is in electrical contact with the contact pin, the trigger circuit is closed as electrical current can pass between the contact and the cylinder.

For embodiments utilizing a tilt switch, the angle at which the tilt switch is mounted to the vehicle and the angle the vehicle is with respect to the earth's gravitational field is important, as a tilt switch can be designed to be mounted at an appropriate tilt switch angle. By definition, the tilt switch angle is the inclination of the longitudinal axis of the tilt switch tube as measured from the horizontal. If the tilt switch is mounted such that the tilt switch tube is horizontal, the tilt switch may be ineffectual as the ball would roll back and forth in a state of instability known as neutral equilibrium. To remedy this, the tilt switch can be mounted such that the end of the tilt switch tube having the trigger circuit is elevated above the other end, in which the tilt switch ball resides when the vehicle is at rest. The end at which the ball rests is thus the "bottom" of the tube; the ball does not fully reach the trigger switch end of the tube until a combination of magnitude of deceleration, length of time of deceleration, angle with respect to horizontal cause the ball to reach the trigger switch. If the magnitude of the deceleration is considered constant and the length of time the deceleration need not be taken into account as the circumstances are such that braking at braking deceleration will typically be long enough, then we can refer to a threshold deceleration (e.g. a deceleration associated with vehicular braking) that acts upon the tilt switch ball and causes the ball to reach the trigger switch. As the ball may unrestrainedly traverse the length of the tube (and is only biased toward the tube's bottom end as a result of the tube's inclination), a threshold deceleration of the vehicle exerts a force sufficient to force the ball up the incline, whereupon the ball closes the trigger circuit.

In a specific embodiment, the tilt switch angle is between 5 to 7 degrees in order to avoid a false positive caused by non-braking events (e.g. bouncing due to uneven terrain or bouncing that is induced by the occupants' entry or exit or the reorientation of the vehicle from the horizontal). In embodiments that relate to vehicles limited to flat and/or smooth terrain, to larger vehicles, or to vehicles with non-rigid suspensions, a smaller tilt switch angle suffices. Similarly, for embodiments that relate to vehicles that are commonly or easily bounced about, the tilt switch angle can be increased.

In another embodiment, there is at least one additional tilt switch mounted at a second tilt switch angle that is different from the first tilt switch angle. The second tilt switch angle may be steeper or shallower as compared to the first tilt switch angle. When the vehicle is traveling down a grade equal to or greater than the first tilt switch angle, the first tilt switch may be falsely triggered by gravity rather than braking. To prevent such a "steep-grade induced" false positive, an inclinometer can be provided to detect when the vehicle travels down a steep grade, which enables the reading of the first tilt switch to be discarded, at which point the detection of braking is performed via the additional tilt switch (which remains accurate due to its steeper tilt switch angle). Specific embodiment can incorporate two or more tilt switches, each having the same designs and each oriented at a different tilt switch angle, where the difference in tilt switch angles between the various tilt switches remains the same. Alternative embodiments can incorporate two or more tilt switches having different designs such that each tilt switch is triggered differently for different combinations of angle orientation, magnitude of decelerations, length of time of deceleration, and other factors. Such different designed tilt switches can be at the same or different angle of orientation can have different weight balls, different site balls, different site balls, different length tubes and/or other differences.

In an embodiment, a printed circuit board has a countdown timer circuit that is triggered by the activation of the one or more tilt switches, which also activate at least one brake light when triggered. Expiry of the timer deactivates all brake lights. In a further embodiment, the printed circuit board is associated with a memory module wherein the countdown timer's duration is stored; this duration is pre-programmed and/or is adjustable by rewriting the memory value. The printed circuit board may be encased in a covering for protection against the elements. In an embodiment, vibration transfer between elements is minimized by separating the tilt switch housing from the printed circuit board surface by a distance. In a specific embodiment, the tilt switch separation distance is between 5/16 inches and 3/8 inches. In another embodiment, the printed circuit board is attached to the vehicle by a double-faced adhesive tape that in addition acts as a shock absorber. Isolating the system from external or vehicular vibrations thus improves the reliability and responsiveness of braking detection.

In a specific embodiment, the tilt switch is a Model BL 370H S manufactured by Dongguan Bailin Electron Co., Ltd.; at a speed of 2 mph, the time between commencement of stop motion and brake light ignition is 0.0001 seconds (0.1 ms). At a speed of 13 mph, which is the maximum speed of a standard electric golf cart, the time between commencement of stop motion and brake light ignition is 0.000015 seconds (15 µs). These time values of such short duration that any delay is negligible and does not substantially impact the subject invention's goal of increasing vehicular safety.

In embodiment, a kit is provided, including comprising a printed circuit board with countdown circuit, one or more tilt switches associated with the printed circuit board and mounted at pre-determined tilt switch angle(s), and one or more brake lights. A kit facilitates the expeditious aftermarket installation of the subject invention in a manner that is approachable to untechnical or inexperienced individuals. In a further embodiment, one or more fasteners are provided to attach or secure the subject invention. Types of fasteners include: adhesive tape, screws, anchors, nails, Velcro®, or any other means of fastening that is obvious to a person having skill in the art. One or more brake lights may be provided, to be positioned on the rearward portion of the vehicle and with a rear-facing orientation. However, the one or more brake lights may be otherwise positioned and/or oriented on the vehicle in order to address visibility concerns, to comply with height or width requirements, to economize material requirements, etc. In a specific embodiment, the kit comprises a control unit that houses the printed circuit board with countdown timer circuit, one or more rolling ball tilt switches mounted at one or more tilt switch angles, and power source; one or more brake lights are connected to the control unit In an embodiment, the brake lights and printed circuit board are provided with a magnetic fastener to swiftly enable installation, adjustment, and removal of the subject invention. Additionally, the choice of a magnetic fastener offers a level of reusability that greatly surpasses adhesive-based fasteners. For embodiments which utilize magnetic attachment, it is critical that the magnetic field does not interfere with other aspects of the invention. This is especially true for embodiments using the rolling ball tilt switch type. In one embodiment, magnetic interference is obviated by design choices that physically separate elements sensitive to magnetism away from the field's influence. In an alternative embodiment, the effect of the magnetic field may be minimized by selecting a tilt switch ball material with low magnetic susceptibility while ensuring that the ball's external surface has the requisite electrical conductivity to close the trigger circuit.

Every embodiment of the subject invention can be subdivided into two further embodiments depending on the choice of power supply. In certain embodiments, the power source derives sufficient power from the vehicle's pre-existing electrical system, to which the power source is electrically connected. In other embodiments, the power supply derives electricity from a power source that is provided. In one embodiment, the power supply is a rechargeable battery. In a further embodiment, the rechargeable battery is recharged by the conversion of solar energy to electricity, such as by providing a photovoltaic cell.

"Brake light" as used throughout this disclosure refers to any electric light that functions as a visual cue that a vehicle is braking. "Brake light" is synonymous to and may be used interchangeably with "tail lights," "braking indicator," and such other terms as would be recognized by a person having ordinary skill in the art.

Figure 2:
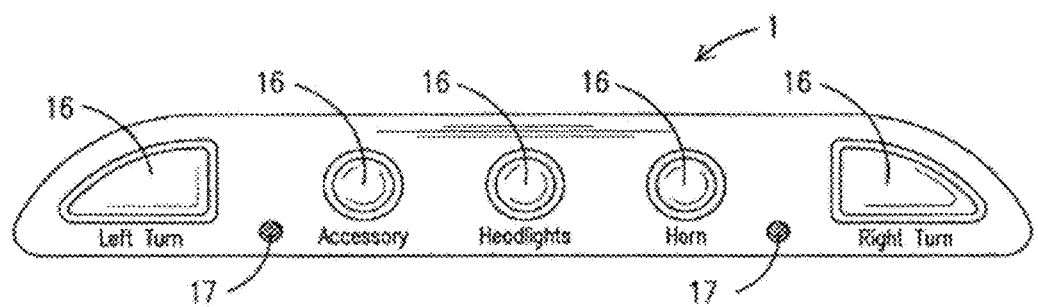
FIG. 2 is a front view of a sender of a wireless light and accessory control system for golf carts and/or other vehicles.
Figure 3:
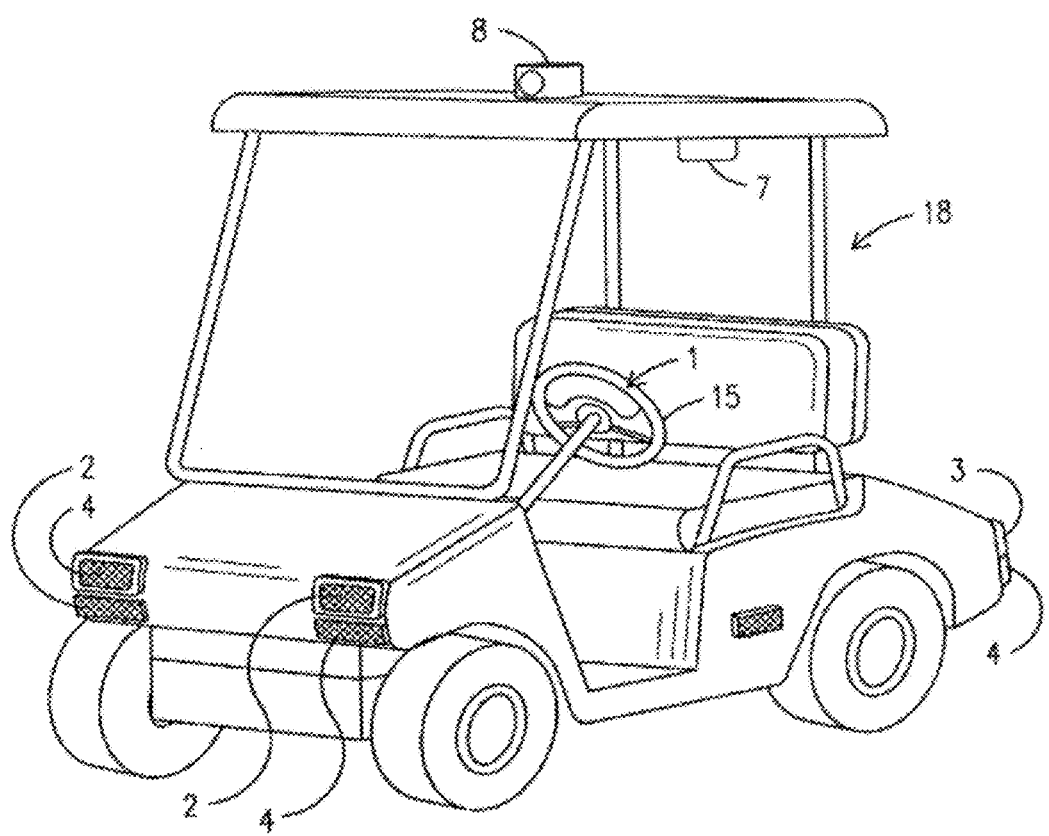
FIG. 3 is a front perspective view of a golf cart having a sender and accessories of a wireless light and accessory control system for golf carts and/or other vehicles mounted thereon.
Figure 4:
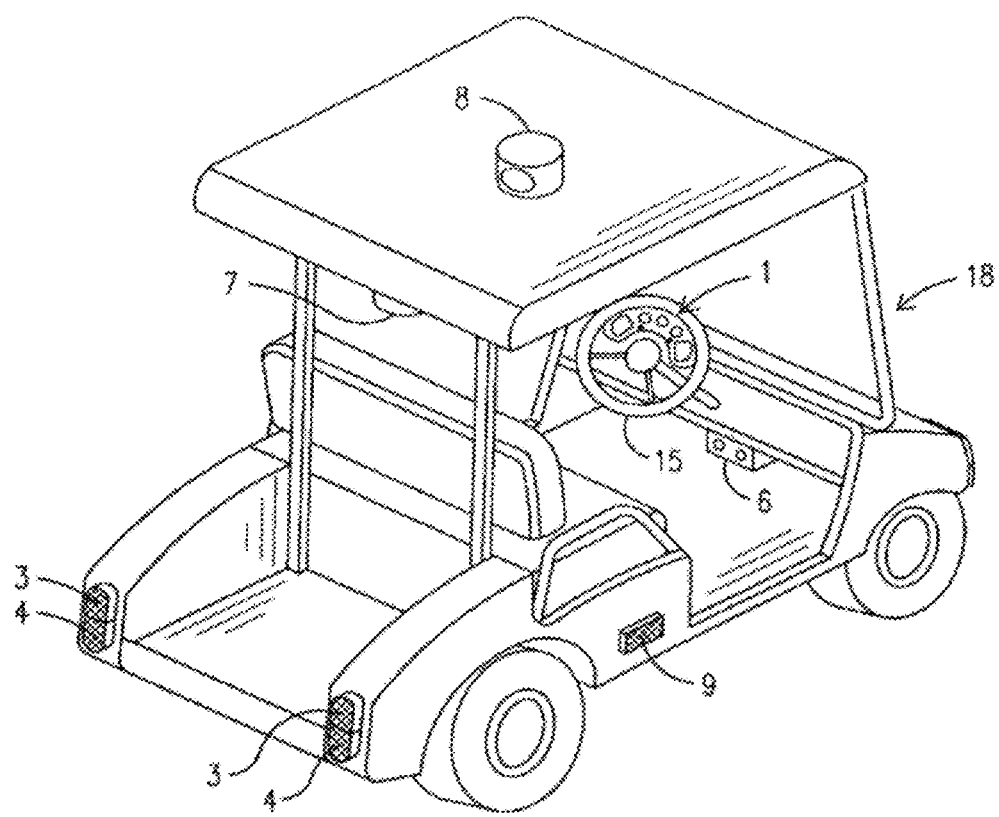
FIG. 4 is a rear perspective view of a golf cart having a sender and accessories of a wireless light and accessory control system for golf carts and/or other vehicles mounted thereon.
Figure 5:
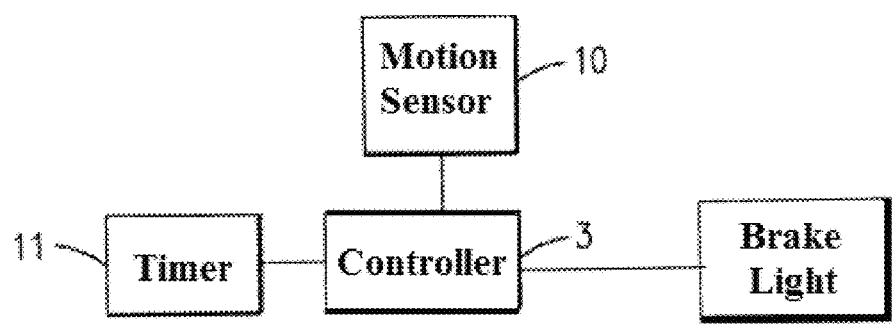
FIG. 5 is a block diagram of an alternative embodiment of a wireless light and accessory control system for golf carts and other vehicles.

For purposes of describing the preferred embodiment, the terminology used in reference to the numbered accessories in the drawings is as follows:

1. sender
2. head light
3. brake light
4. turn signal
5. horn
6. radio
7. dome light
8. emergency light
9. side marker light
10. motion sensing means
11. timer
12. wireless transmitter
13. controller
14. power source
15. steering wheel
16. pushbutton -continued 17. indicator light
18. golf cart With reference to FIG. 1, a block diagram of a wireless light and accessory control system for golf carts and other vehicles is shown. The wireless light and accessory control system for golf carts and other vehicles is comprised of a sender 1 that permits a user to remotely activate various accessories, such as headlights 2, brake lights 3, turn signals 4, a horn 5, a radio 6, a dome light 7, emergency lights 8, side marker lights 9 and so forth, by sending wireless signals via a wireless transmitter 12 located in the sender 1 to a controller 13 that is electronically connected to each of the accessories. The wireless transmitter 12 may be a single or multi-frequency wireless transmitter. Further, the wireless signals may be coded for each accessory being activated or deactivated. In addition, the accessories may be activated or deactivated using timers 11, or a motion sensing means 10. For example, after a predetermined amount of time, a timer 11 located in the controller 13 would deactivate the turn signals 4. A signal from a motion sensing means 10, such as a motion sensor, a tilt switch, an accelerometer, a speedometer, etc., that sends a signal to the controller 13 or directly to the brake lights 3, as shown in FIG. 5, would activate and deactivate the brake lights 3. In addition, a timer 11 located in the controller 13 may deactivate the brake lights 3 after a predetermined amount of time. The controller 13 and accessories would be powered by a power source 14, such as an internal battery or a golf cart battery. The sender 1 would also be powered by a power source 14, such as an internal battery or a golf cart battery Now referring to FIG. 2, a front view of a sender 1 of a wireless light and accessory control system for golf carts and other vehicles is shown. The sender 1 may be mounted to a steering wheel 15, as shown in FIGS. 3 and 4, or in the vicinity of the steering wheel, such as to the dash board, console, roof, steering column, etc. using various attachment means, such as brackets, screws, clamps, glue, hook and loop fasteners and so forth. The sender 1 permits a user to remotely activate the various accessories of the wireless light and accessory control system for golf carts and other vehicles by wireless signals via a wireless transmitter 12 located in the sender 1 to a controller 13 that is electronically connected to each of the accessories. The wireless transmitter 12 may be a single or multi-frequency wireless transmitter. Further, the wireless signals may be coded for each accessory being activated or deactivated. The sender 1 includes a display having a plurality of push buttons 16 to activate and deactivate the various accessories connected to the controller 13. The sender 1 may also have indicator lights 17 that illuminate to indicate when accessories are activated, for example indicator lights 17 may be programmed to blink when the turn signals 4 are activated.

Now referring to FIG. 3, a front perspective view of a golf cart 18 having a sender 1 and accessories of the wireless light and accessory control system for golf carts and other vehicles mounted thereon is shown. Head lights 2 are mounted on the front of a golf cart 18 so that a user may operate the golf cart 18 safely in the dark. In addition turn signals 4 are mounted on the front and back of the golf cart 18 so that a user may communicate to third parties which direction the user is planning on turning. Brake lights 3 are mounted to the back of the golf cart 18 to warn third parties that the golf cart 18 is coming to a stop. The sender 1 is mounted to a steering wheel 15 and activates the accessories via wireless signals sent to the controller 13, as shown in FIG. 1.

Now referring to FIG. 4, a rear perspective view of a golf cart 18 having a sender 1 and accessories of the wireless light and accessory control system for golf carts and other vehicles mounted thereon is shown. Turn signals 4 are mounted on the back of a golf cart 18 so that a user may communicate to third parties which direction the user is planning on turning. Brake lights 3 are mounted to the back of the golf cart 18 to warn third parties that the golf cart 18 is coming to a stop. In addition, a radio 6, dome light 7, emergency light 8 and side marker light 9 are mounted to the golf cart 18. The sender 1 is mounted to a steering wheel 15 and activates the accessories via wireless signals sent to the controller 13, as shown in FIG. 1.

Finally, referring to FIG. 5, a block diagram of a wireless light and accessory control system for golf carts and other vehicles is shown. A signal from a motion sensing means 10, such as a motion sensor, a tilt switch, an accelerometer, a speedometer, etc., sends a signal directly to the brake lights 3 that activates or deactivates the brake lights 3. In addition, a timer 11 deactivates the brake lights 3 after a predetermined amount of time.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

Figure 8A:
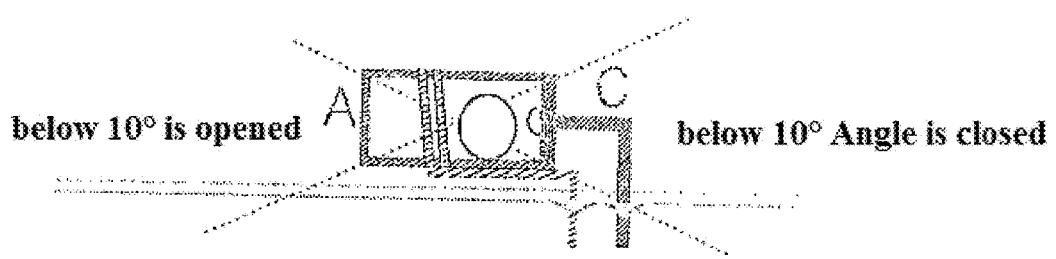
FIG. 8A shows a schematic of a tilt switch in accordance with an embodiment of the invention.
Figure 8B:
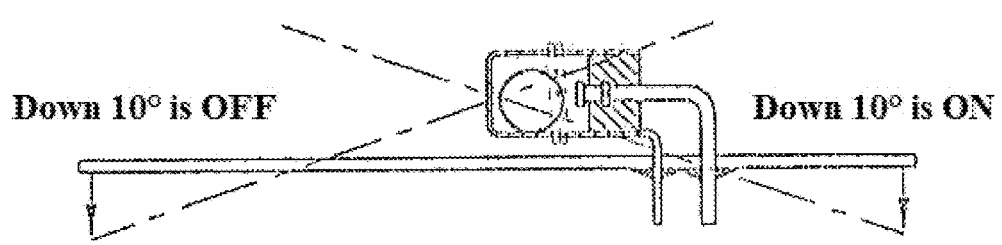
FIG. 8B shows a schematic of a tilt switch in accordance with an embodiment of the invention.
Figure 9:
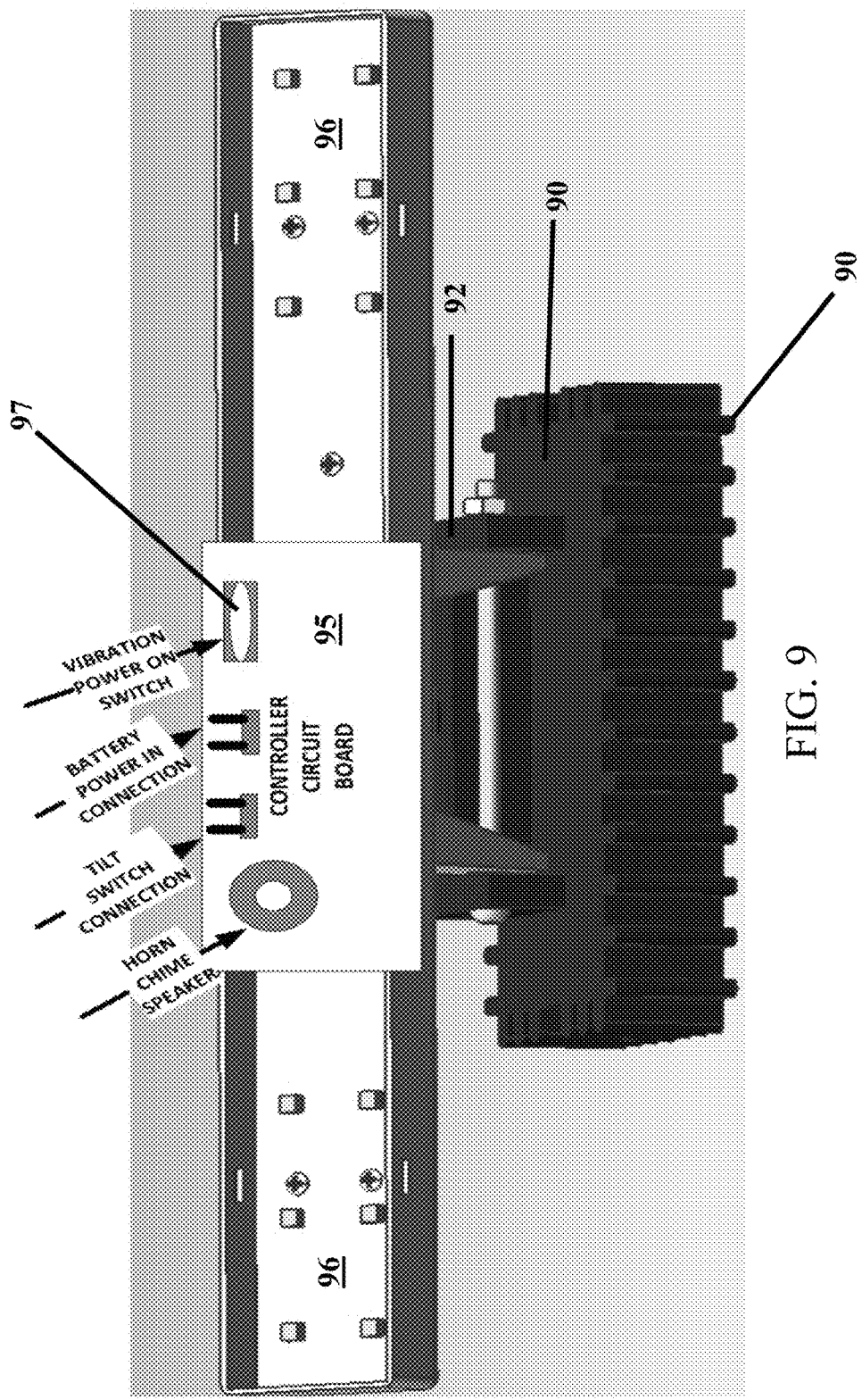
FIG. 9 shows a representation of a wireless light system for golf carts and/or other vehicles.
Figure 10A:
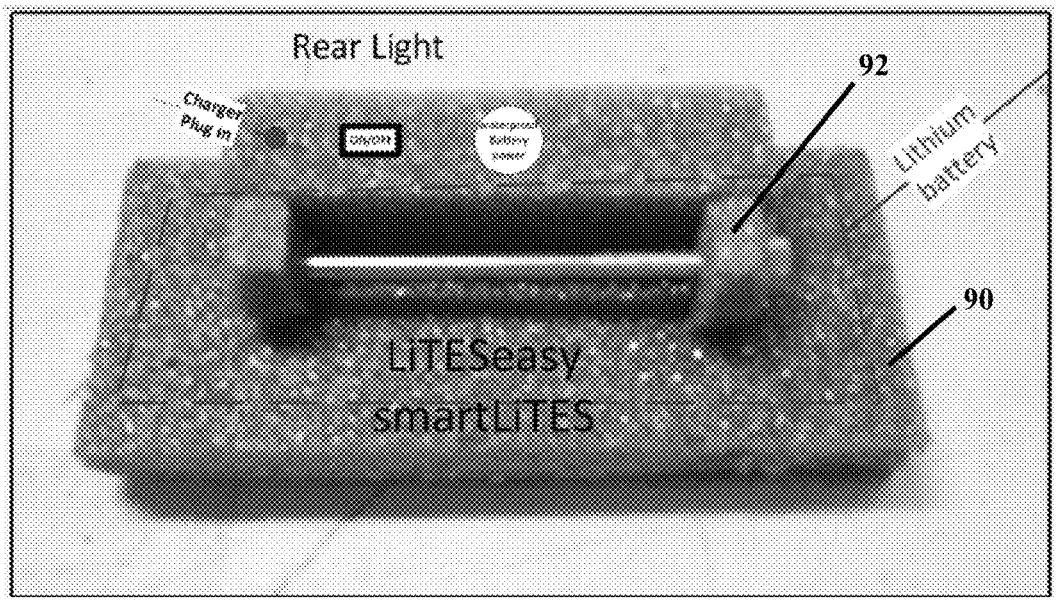
FIG. 10A and FIG. 10B show a top view of a representation of a battery case with a mount for mounting the light fixture of a wireless light system for golf carts and/or other vehicles.
Figure 10B:
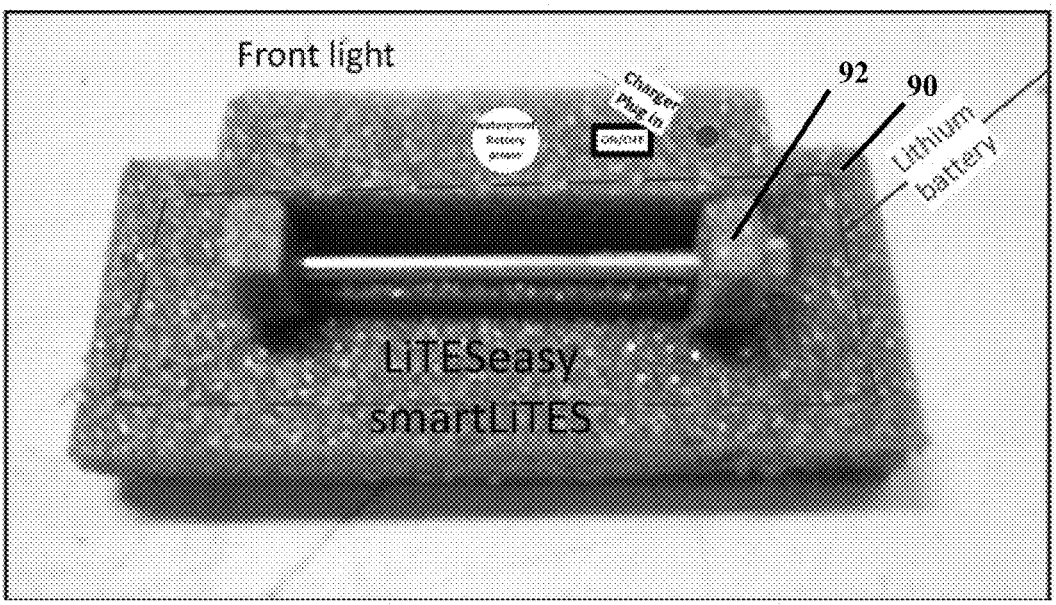
Figure 11A:
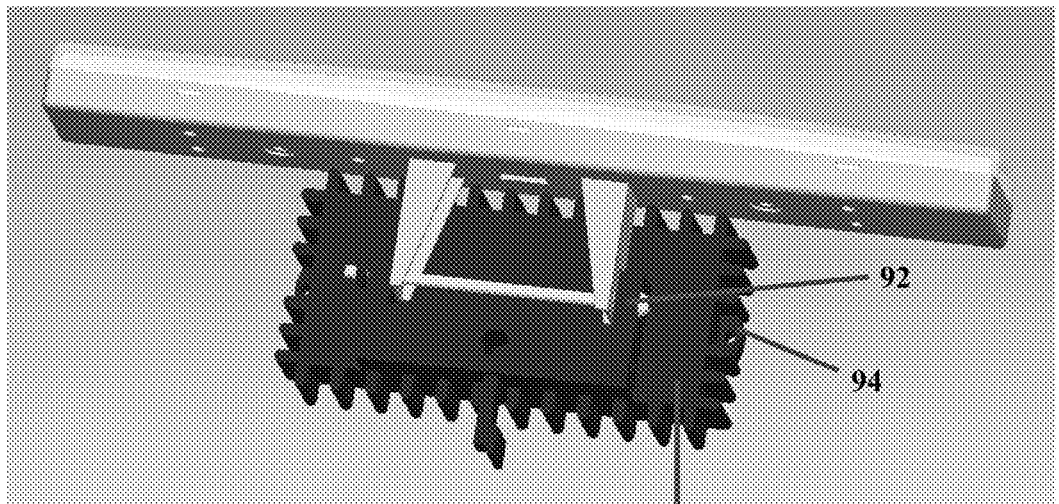
FIG. 11A and FIG. 11B show two perspective views of a wireless light system for golf carts and/or other vehicles.
Figure 11B:
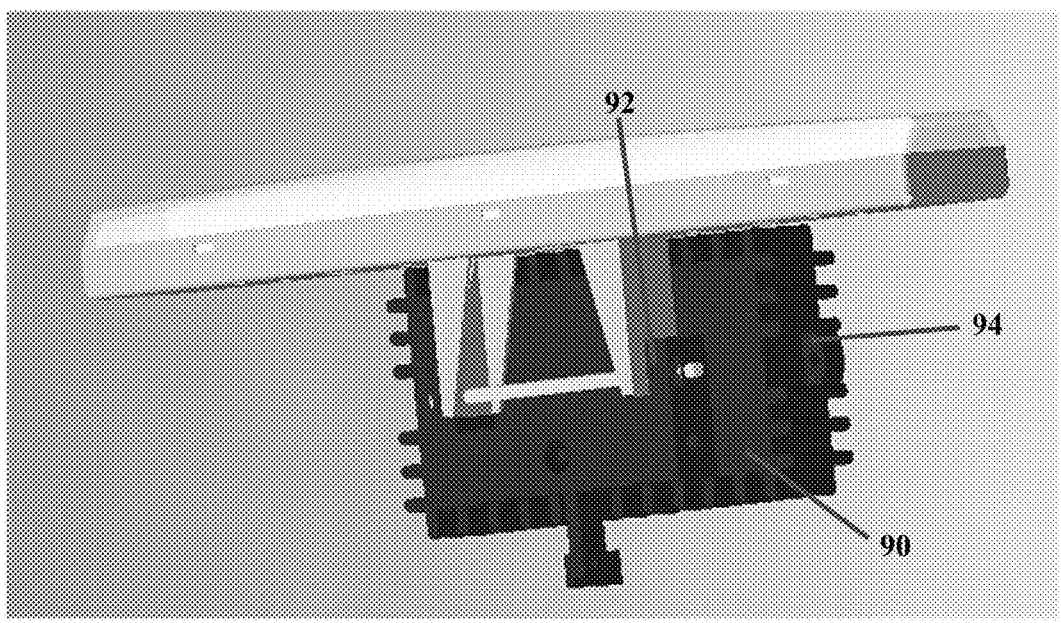

The roll ball switch (Beelee Bailing Electronics Co., Ltd. model no. BL-370H-S) shown in FIGS. 6 (dimensions in mm) and 8B, which can be used in an embodiment of the invention, is a single ball tilt switch where when the switch's tilt to conductive terminal A, shown in FIG. 8A, is more than 15 degrees there is an open circuit OFF-state, and when the switch's tilt changes, such that trigger (gold plated pin end C) is below the horizontal gradient by more than 10 degrees there is a closed circuit ON-state. This tilt switch has the following characteristics:

Electrical Characteristics:
1. Voltage: <12V
2. Current: <20 mA
3. Conductive time: 2 ms
4. Closed resistance: <10 ohm
5. Open resistance: >10 M ohm Mechanical Characteristics:
1. Temperature range: −40° C. to 80° C.
2. Pull force of terminal: 500 gf for 1 minute
3. Humidity: 95% RH, 40° C. for 96 hours
4. Operating lifespan: 100,000 cycles Material List:
1. Copper tube: Copper tube silver-plated
2. Guide pin: Brass wire, gold-plated
3. Ball: One Copper Ball, silver-plated
4. Heat shrink tub: PET Heat shrinkable tube, black
5. Sealing colloidal particle: Heat resistance nylon
5. Lead spring: Phosphorus copper wire Welding Characteristics
Solder tin, tin content 100%
Welding humidity: 260° C.
Welding time: 2-2.5 seconds
Do not use strong acid, alkali flux
Packaging:
1000PCS/bag (PVC plastic)

Product Details Specification
Model: Roll ball switch BL-370H-S
Date: 2013 Oct. 4
Page: 3-3

Because of the use of golf carts on rough terrain the suspension is heavy duty and stiff. Use by children and adults who in many cases rent and abuse the cart justifies many of the requirements below.

Today more and more communities are adapting what are called "street legal" standards. This requires the brake light control to be comparable to mechanical brake light activation Tilt switch can be positioned downward, e.g. approximately 5-7 degrees, to offset bouncing and getting in and out of cart, etc.

Cushion mounting controller box with double face tape acts as shock absorber for reliable brake pedal like response.

Thin copper wires from tilt switch housing to PCB can be attached so as to create a space of 5/16" to 3/8" to reduce vibration transfer.

A preferred embodiment utilizes a tilt switch that has a center mounted contact pin. Many tilt switches are manufactured with 2 off-centered conducting pins. Embodiments incorporating such tilt switches need to be mounted and manufactured in a specific manner such that the brake light will not work, and embodiments using such tilt switches may not work going up a grade so as to only, work going down a steep grade and/or only work at sudden stops or severe agitation.

Embodiments of a specific tilt switch utilized with embodiments of the invention have dimensions that smaller than typical tilt switches, which are 3 to 10 times longer. These longer tilt switches tend not to work at slower speeds and coasting stops.

Clearance in the switch ball tube should be sufficient to create a free travel path, but not too large to allow the ball to rattle in the tube and inhibit horizontal movement.

In a specific embodiment, the tilt switch tube is one of the conductors, so the ball can open the circuit while the cart is making a turn.

The weight and volume of tilt switch ball should be selected to reduce, or avoid, false signals to the brake light, but also to activate the brake light at slow speeds.

In a specific embodiment, the brake light controller activates a brake light within approximately 0.0001 0.001, 0.01, and/or 0.1 second after the brake is applied. A mechanical brake pedal switch typically activates the brake light within approximately 0.0001 second after the brake is applied.

Embodiments can design the tilt switch to be mounted at a specific angle to activate at slow speeds, while operating on rough terrain with reduced false brake signals.

Embodiments can be designed to leave the brake light on between 7 and 8, between 7.5 and 8.5, between 8 and 9, between 8.5 and 9.5, and/or between 9 and 10 seconds, such as 7, 7.5, 8, 8.5, 9, 9.5, or 10 seconds total, after activation, or after activation stops.

At 2 mph the tilt switch shown in FIG. 6 makes contact in 0.00008 seconds (adding switch conductive time equals 2 ms or 0.000002 seconds) such that, at 2 mph, the total time from commencing of stop motion and brake light ignition is 0.000082 seconds.

At 13 mph, the maximum speed of a standard golf cart, the switch shown in FIG. 6 makes contact in 0.000013 seconds (adding switch conductive time equals 2 ms or 0.000002 seconds) such that at 13 mph, the total time from commencing of stop motion and brake light ignition is 0.000015 seconds.

In a specific embodiment utilizing the tilt switch shown in FIG. 6 (where dimensions are shown in mm) and 8B, and FIG. 8A shown another tilt switch with a similar structure:

In a specific embodiment utilizing the tilt switch shown in FIG. 6:

has a distance of ball travel in the tilt switch that is 1/3 to 1/10 the distance of typical tilt switches (e.g., 0.8 mm in FIG. 6);

has a center positioned conductor point (guide pin) in the tilt switch (e.g. brass wire with gold plating);

the tilt switch tube acts as a conductor (e.g. a copper tube with silver plating);

the tilt switch is configured to be the installed at an angle of the tilt switch in the vehicle when on level ground that is in a range of 4-8, 5-8, 4-7, 4-6, 6-8, and/or 5-7°;

has a single ball in the tilt switch;

spaces the tilt switch from the PCB a distance in the range 3/16" to 1/2", 1/4" to 7/16" 5/16" to 3/8", in order to reduce vibration transfer from PCB to tilt switch;

reduced shock to controller to reduce, or avoid, false brake light activation.

Specific embodiments relate to a light system, a method of providing light from a headlight, light form a taillight, and a method of mounting a light system, that has few is any wires connecting the light system to, or interfering with, any existing electrical circuitry of the gold cart. Specific embodiments can be installed on any golf cart, such as in the same location(s) as prior light systems. Embodiments of the subject light system can be rear tail lights, rear braking lights, front running lights, and/or front headlights. Embodiments of the subject light system can incorporate modular parts, such as modular parts in a light kit, which can easily be replaced. The ability to replace modular parts allows less importance to be places on defects and failures, and related costs.

Referring to FIGS. 9-15, a specific embodiment of the subject light system is shown and/or represented.

A potential weakness of the batteries utilized with embodiments of the subject light system is exposure of the batteries to the sun, and the batteries getting too hot, which can reduce battery life. Optional fins 91 are shown on the battery case 90 in FIG. 9. These fins are not to dissipate heat, as is often the purpose of fins, as the case is plastic and, therefore, not very thermally conductive. The fins act as a shade, e.g., like a pergola, to reduce the surface area directly exposed to sunlight. Specific embodiments can have a chrome plating plastic, which can reduce absorbed heat by about 33%. The fins may also provide an additional cooling effect.

Figure 12B:
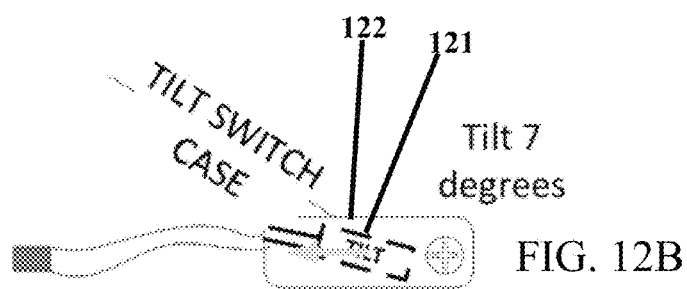
FIG. 12A, 12B and FIG. 12c show a top view of the battery case and mount for the light fixture, side view of the tilt switch case, and a side view of the battery case and mount for the light fixture, respectively, of a wireless light system for golf carts and/or other vehicles.
Figures 12A, 12C:
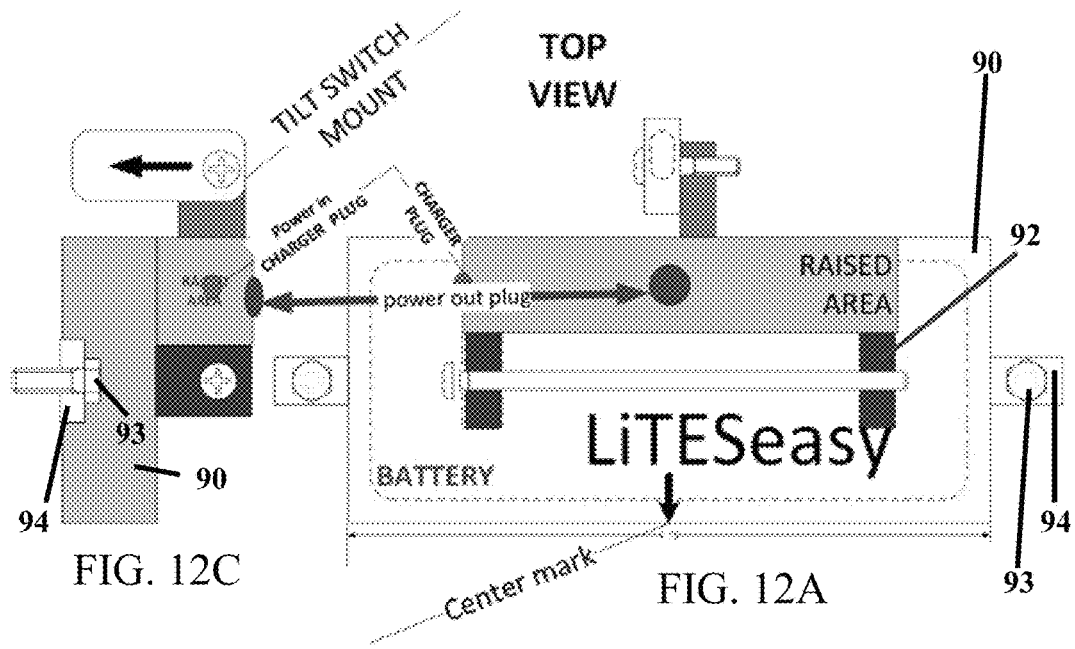
Figure 14A:
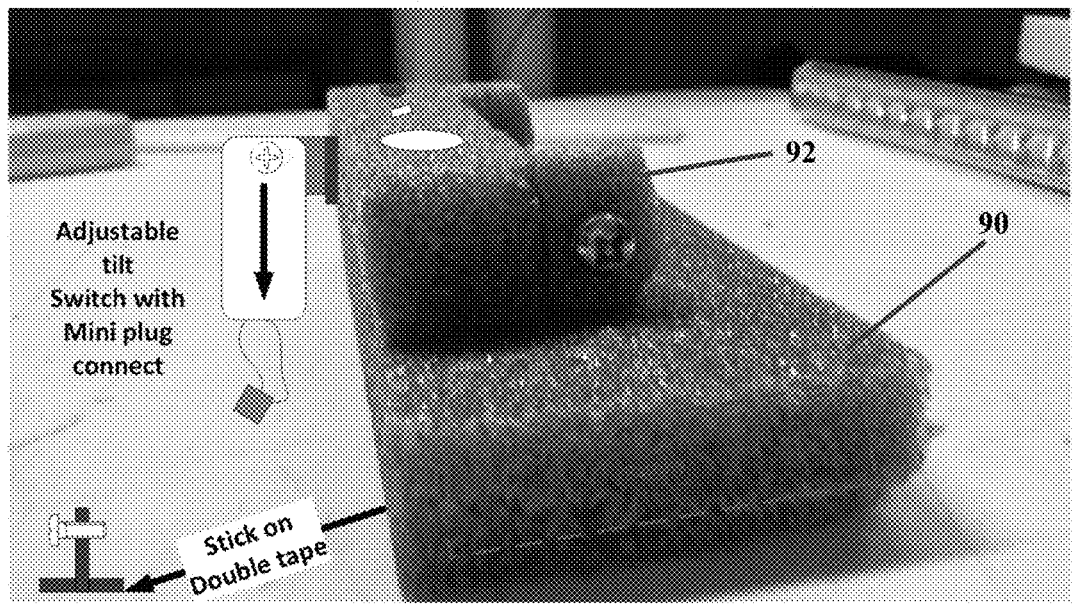
FIG. 14A and FIG. 14B show two perspective views of a wireless light system for golf carts and/or other vehicles, showing the side view of the tilt switch case.
Figure 14B:
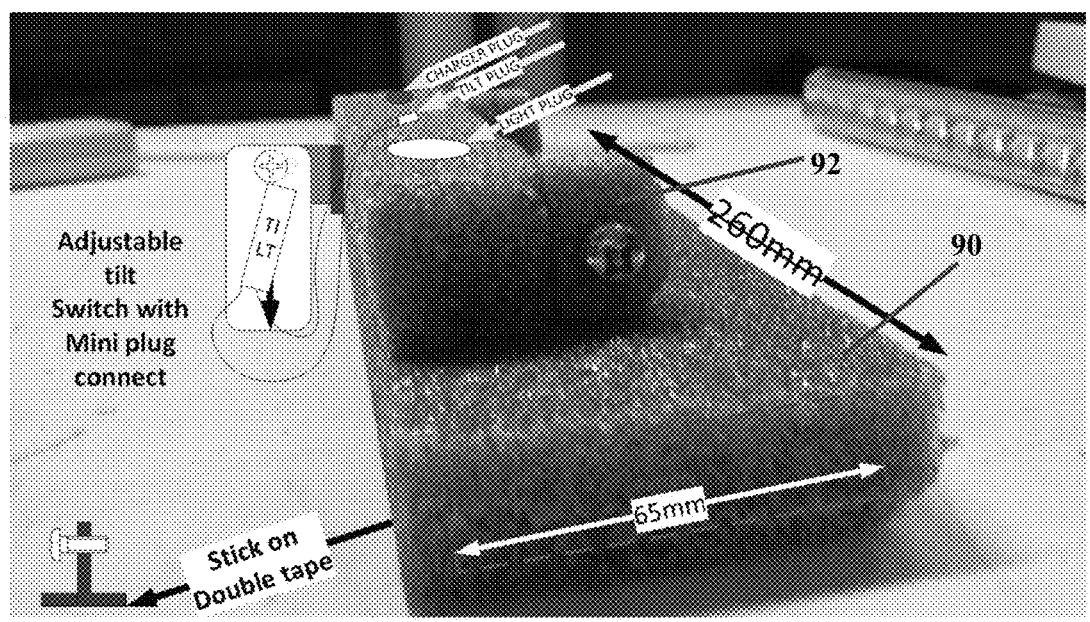
Figure 15:
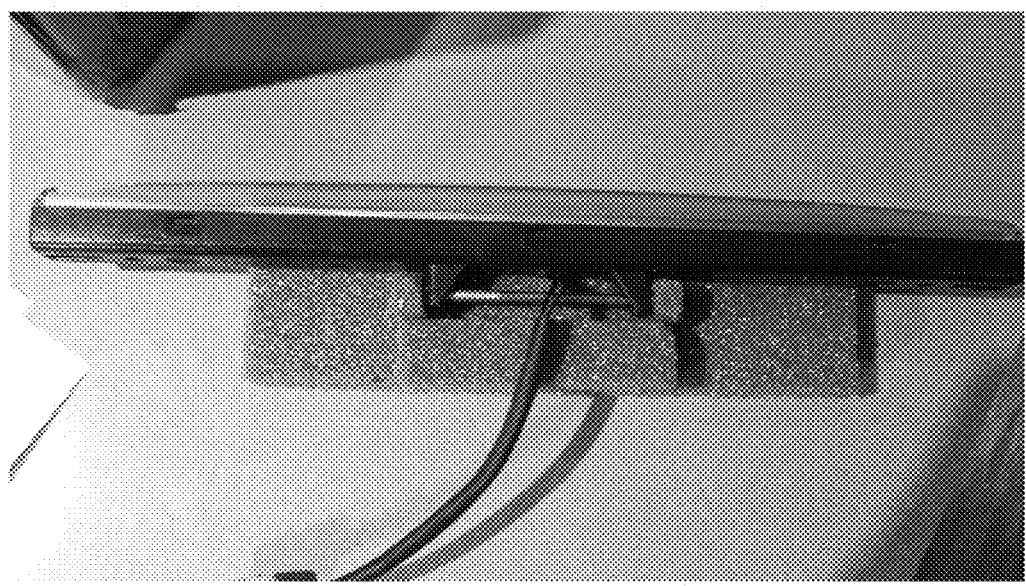
FIG. 15 shows a top view of a light assembly mounted to a representation of a battery case of a light system for golf carts and/or other vehicles.

Embodiments of the subject light system can incorporate one or more tilt switches, as taught herein, in the brake light system. Referring to FIG. 12A-12C, the tilt switch 121 can be located in a switch pod, or case, 122 attached to the rear light battery case. Mounting the switch pod on the exterior of the battery case 90 allows for the tilt switch to be adjusted for each installation assuring consistent operation on each cart.

Figure 16:
FIG. 16 shows a variety of golf cart illustrating where on the golf cart a light assembly in accordance with the subject invention can be mounted.

The headlight can be located on a, usually slightly convex, spot centered under the folded over plastic windshield installed on most carts. FIG. 16 shows a variety of golf carts and shows where an embodiment of the subject light system incorporating a head light can be mounted and where an embodiment of the subject light system incorporating a tail light can be mounted.

Specific embodiments have a battery case that is also the light bracket 92 for attachment of the light system to the gold cart. The battery case can be attached to the golf cart via a variety of mechanisms, such as screws, or bolts, 93 passing through tabs 94 on the case (e.g., tabs on each side of the case), double face tape dense foam double face tape, and in a specific embodiment, strips of 1/4", 3/8", and/or other thickness, of dense foam double face tape. The thick dense foam double face tape can help to attach the light system to surfaces of golf carts having a variety of shapes, such as convex, concave, or flat shapes (e.g., the surface of the golf cart's front cowl). Using strips of the thick dense foam double face tape can create a space, or gap, between the strips of tape and between the light system and the surface the light system is mounted to, in order to allow air to pass under the case and cool the underside of the light system. In addition, using strips of the thick dense foam double face tape can create a space, or gap, between the strips of tape and between the light system and the surface the light system is mounted to, for water to flow through under the light system and away, such that the water does not collect on, or seep into the battery case. The thick dense foam double face tape can allow easy transfer from one golf cart to another, when attached with tape only.

Referring to FIGS. 11A-11B and 12A-12C, the light system shown is configured to be mounted such that the light fixture, when a tail light fixture, faces behind the golf cart, and, when a headlight fixture, faces in front of the golf cart, such that the tilt switch can be rotated such that the angle the tilt switch makes with respect to the horizontal of the golf cart, in a vertical plane passing through the forward direction of travel of the golf cart, can be modified during, and/or after, mounting the light system on the golf cart, where the horizontal of the golf cart is a plane parallel to the ground when the golf cart is positioned on level ground, and the vertical plane passing through the forward direction of travel of the golf cart is perpendicular to the horizontal of the golf cart.

FIG. 12B shows how the tilt switch case 122 case rotate about the screw, or other mechanism, used to mount the tilt switch case to the tilt switch mount connected to, or integral with, the battery case, so as to modify the angle the tilt switch makes with respect to the horizontal of the golf cart, in a vertical plane passing through the forward direction of travel of the golf cart, during, and/or after, mounting the light system on the golf cart. Modifying the angle the tilt switch makes with respect to the horizontal of the golf cart, in a vertical plane passing through the forward direction of travel of the golf cart modifies the threshold deceleration need to close the tilt switch, and activate the tail light (e.g., brake light), for a certain angle with respect to the horizontal of the golf cart, in a vertical plane passing through the forward direction of travel of the golf cart that the battery case is mounted at. The tilt switch is designed to be positioned at a certain angle with respect to the horizontal of the golf cart, in a vertical plane passing through the forward direction of travel of the golf cart, in order to operate properly, and modifying the angle the tilt switch makes with respect to the horizontal of the golf cart, in a vertical plane passing through the forward direction of travel of the golf cart allows the tilt switch to be positioned correctly for a given angle the battery case makes with respect the horizontal of the golf cart in the vertical plane passing through the forward direction of travel of the golf cart.

In alternative embodiments, the tilt switch can be mounted to other portions of the light assembly or mounted to the golf cart, and the angle the tilt switch makes with respect to the horizontal of the golf cart, in a vertical plane passing through the forward direction of travel of the golf cart can be modify as needed to correctly position the tilt switch with respect to the golf cart, to the horizontal of the gold cart, and to the vertical plane passing through the forward direction of travel of the golf cart.

The light fixture mount shown in FIGS. 11A-11B and 12A-12C can also allow the light fixture to be rotated with respect to the battery case during, and/or after, mounting the light system on the golf cart. Allowing such rotation can allow the direction of light to be modified. Further embodiments can incorporate mounts for mounting the light fixture to the battery case that allow repositioning the light fixture with respect to the battery case in other degrees of freedom, such as translating the light fixture relative the battery case in the forward direction of travel, perpendicular to the forward direction of travel, in a plane parallel to the horizontal of the golf cart, and/or rotating the light fixture with respect to the battery case about one or more axis, such as via a ball mount or other mounting system.

In an embodiment, a remote control can be used to operate the light. The remote control can be mounted on the golf cart, such as via a mount on the steering wheel. In alternative embodiments, no remote control is needed, and the lights can be operated by a switch on the light system, and/or other mechanism. In an embodiment, the electronics 95 of the light system 5 can be position near the center of the light fixture of the light system and receive signals from the remote control if a remote control is used, signals from the switch on the light system, and/or other mechanism if such is used, signals from the tilt switch, power from the charger, and optional signals from other devices, where the lights (e.g., LED lights) can be positioned at the outside ends of the light system. In a specific embodiment, the controller of FIG. 5 can be 10 incorporated in the electronics 95 on the light fixture, and can receive a signal from the tilt switch and send a signal to the brake light of the light fixture, where the timer can be in the electronic 95 on the light fixture or the controller can receive a signal form a timer that is external to the electronics 95 on the light fixture. Alternative embodiments position the electronic at other locations on the light fixture of the light system.

Embodiments of the light system, receiving operating signals form a remote control, can be on standby all the time, listening for the signal from the remote control. Specific embodiments do not allow the remote control to turn the light system unit off. Other embodiments can operate in a manner such that the receiver is not on standby all the time, as always being on standby can greatly reduce the available power to operate the lights when needed. In an embodiment, the light system can incorporate a very sensitive vibration switch 97, such that the light system listens for the signal from the remote control when the very sensitive vibration switch is activated. In this way, any time the golf cart is jostled the light system can go into standby mode, and stay on standby mode, for a certain period of time, until movement stops, until movement stops followed by an certain period of time, or other criterion is met. Specific embodiments can incorporate 6 amp hour batteries that will light up to 14 hours for the headlight, and up to 30 hours for the tail light, where the headlight is a total of 6 watts 600 lumens, such that an average cart owner can charge the batteries once or twice a month. An electronic gauge can be incorporated to indicate the battery status. The batteries should take a charge between 300 and 500 times, and lose about 20% storage capacity a year. A charger and cables, can be incorporated, and can be lighted yellow to reduce tripping over and driving off before disconnecting. The light fixture can send a signal regarding the battery charging status, such as the percentage amount of charge, or other metric regarding the amount of charge remaining, or the lights can flash when a certain amount of charge is remaining to signal it is time to charge the batteries.

Specific embodiments can have a rear battery case mounted on the rear of the golf cart, with a light fixture mounted to the rear battery case, and a tilt switch mounted to the rear battery case that triggers the brake lights, and a front battery case mounted on the front of the golf cart, with a light fixture mounted to the rear battery case, and an optional remote control to operate the front and rear lights.

The invention claimed is:

1. A brake light control system for a vehicle, comprising:
a tilt switch,
wherein the tilt switch is activated by deceleration of the vehicle;
at least one brake light operably connected to the tilt switch;
a power source operably connected to the at least one brake light and the at least one tilt switch,
wherein activation of the tilt switch activates the at least one brake light; and
a printed circuit board,
wherein the printed circuit board comprises a timer, and
wherein the timer deactivates the at least one brake light a predetermined period of time after the activation of the at least one brake light.

2. The system according to claim 1,
wherein the tilt switch is a rolling ball tilt switch, and
wherein the rolling ball tilt switch comprises:
a switch ball tube having a length;
a contact pin; and
a switch ball.

3. The system according to claim 2,
wherein the tilt switch is mounted at a tilt switch angle defined as the angle between horizontal and the switch ball tube, and
wherein the tilt switch angle is between 5° and 7°.

4. The system according to claim 1, further comprising:
a bonding tape strip positioned between the vehicle and the printed circuit board such that the bonding tape strip attaches the printed circuit board to the vehicle and the bonding tape strip acts as a vibration absorber.

5. The system according to claim 1,
wherein the tilt switch is positioned a distance of 5/16" to 3/8" from the printed circuit board.

6. The system according to claim 2,
wherein the contact pin is a center-mounted contact pin.

7. The system according to claim 2,
wherein the length of the switch ball tube does not exceed 6 mm.

8. The system according to claim 1,
wherein the vehicle is a golf cart.

9. A method for controlling at least one brake light for a vehicle, comprising:
providing the brake light control system for a vehicle according to claim 1; and
activating the tilt switch.

10. The method according to claim 9,
wherein the tilt switch is a rolling ball tilt switch, and
wherein the rolling ball tilt switch comprises:
a switch ball tube having a length;
a contact pin; and
a switch ball.

11. The method according to claim 10,
wherein the tilt switch is mounted at a tilt switch angle defined as the angle between horizontal and the switch ball tube, and wherein the tilt switch angle is between 5° and 7°.

12. The method according to claim 9, further comprising:
a bonding tape strip positioned between the vehicle and the printed circuit board such that the bonding tape strip attaches the printed circuit board to the vehicle and the bonding tape strip acts as a vibration absorber.

13. The method according to claim 9,
wherein the tilt switch is positioned a distance of 5/16" to 3/8" from the printed circuit board.

14. The method according to claim 10,
wherein the contact pin is a center-mounted contact pin.

15. The method according to claim 9,
wherein the length of the switch ball tube does not exceed 6 mm.

16. The method according to claim 1,
wherein the vehicle is a golf cart.

* * * * *

UNITED STATES PATENT AND TRADEMARK OFFICE
CERTIFICATE OF CORRECTION

PATENT NO. : 9,908,461 B2
APPLICATION NO. : 14/930340
DATED : March 6, 2018
INVENTOR(S) : Joseph J. Gasper It is certified that error appears in the above-identified patent and that said Letters Patent is hereby corrected as shown below:

Abstract (57),
Line 7, "few is any" should read --few if any--.
Line 9, "gold cart" should read --golf cart--.

Column 3,
Line 12, "embodiment a" should read --embodiment, a--.
Line 41, "gold cart" should read --golf cart--.

Column 4,
Lines 6-7, "gold cart" should read --golf cart--.

Column 9,
Line 66, "16. pushbutton" should read --16. push button--.

Column 12,
Line 5, "terrain the" should read --terrain, the--.
Lines 31-32, "dimensions that smaller than" should read --dimensions smaller than--.

Column 13,
Line 23, "light form a" should read --light from a--.
Line 24, "few is any" should read --few if any--.
Line 26, "gold cart" should read --golf cart--.
Line 34, "to be places on" should read --to be placed on--.
Lines 66-67, "gold cart" should read --golf cart--.

Column 14,
Line 3, "tape dense foam" should read --tape, dense foam--.
Line 36, "case 122 case rotate" should read --case 122 rotates--.
Line 59, "with respect the" should read --with respect to the--.

Signed and Sealed this
Twenty-second Day of January, 2019

Andrei Iancu
*Director of the United States Patent and Trademark Office*

Column 15,
Line 2, "gold cart" should read --golf cart--.
Line 24, "can be position" should read --can be positioned--.
Line 36, "signal form a" should read --signal from a--.
Line 41, "signals form a" should read --signals from a--.